July 5, 1932.  W. J. DENNIS  1,865,746
METAL WEATHER STRIP
Filed Feb. 4, 1929
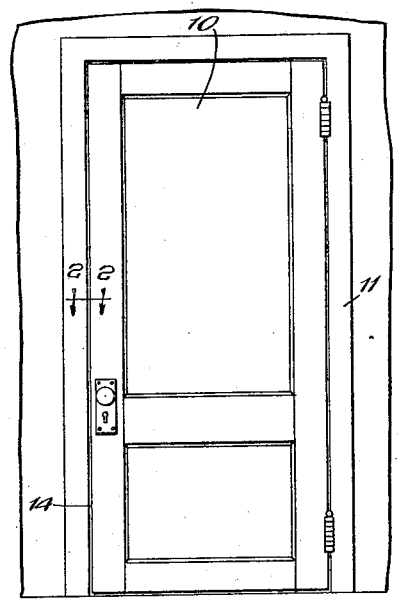
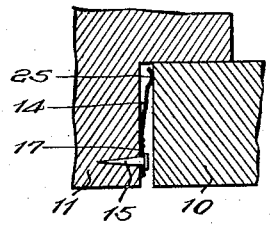
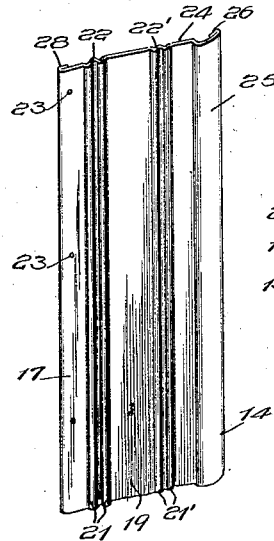
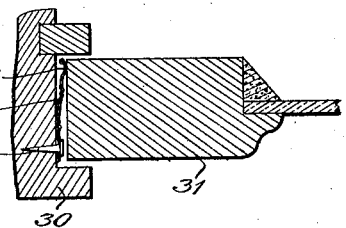

Patented July 5, 1932

1,865,746

UNITED STATES PATENT OFFICE

WILLIAM J. DENNIS, OF CHICAGO, ILLINOIS

METAL WEATHER STRIP

Application filed February 4, 1929. Serial No. 337,404.

My invention has to do with metal weather stripping and may be considered an improvement of the invention described and claimed in my copending application Serial No. 156,865 filed December 24, 1926.

My invention relates to weather strips for use on doors, windows, or the like, for preventing the flow of cold air, dust, dirt, or the like, through or past the windows or doors.

The invention has among its objects the production of a weather stripping that is of simplified construction, compact, convenient, durable, reliable, efficient and satisfactory for use wherever found applicable.

A particular object of the invention is to provide an improved weather strip which may be quickly and easily installed.

Still another particular object of the invention is to provide an improved method of producing weather stripping, which method will enable it to be quickly and easily adjusted to meet various conditions.

Still another object is to provide such a weather strip which will have means adjacent the marginal portions thereof to prevent buckling of the strip, said means also serving, if desired, as a guide for a knife or other suitable instrument for forming a crease in the strip along which the strip may bend longitudinally.

Many other objects and advantages of the construction herein shown and described will be obvious to those skilled in the art from the disclosure herein given.

Referring now to the drawing forming a part of this specification and representing a preferred embodiment of the invention.

Fig. 1 is an elevational view of a door to the frame of which a weather strip embodying my invention is secured;

Fig. 2 is a sectional view taken on the line 2—2 of Fig. 1;

Fig. 3 is a fragmentary perspective view of the improved weather strip; and

Fig. 4 is a fragmentary sectional view taken through a window on which a weather strip embodying my invention has been installed.

Referring first, to Figs. 1 to 3, inclusive, the reference character 10 designates a door hingedly mounted in a door frame 11. Between the free edge of the door 10 and the adjacent portion of the door frame 11 is shown a weather strip 14 embodying my invention, the weather strip being secured to the frame 11 by screws or nails 15 or other suitable means.

As best shown in Fig. 3, my improved weather strip 14 is preferably formed from a strip of sheet metal having some resilience and it preferably comprises a marginal portion 17 adapted to be secured to the frame 11 or to any other suitable support by the nails or screws 15. Formed integrally with the marginal portion 17 is a substantially flat leaf portion 19. Formed on the strip between the leaf portion 19 and the marginal portion 17 is a pair of parallel ridges or grooves 21 depending on the side from which the view is taken. As shown in Fig. 3, the elements represented at 21 appear as a pair of parallel ridges while obviously on the opposite side of the strip grooves will be seen separated by a ridge 22. On the opposite side of the leaf 19 is a similar pair of grooves or ridges 21'.

Adjacent the ridges 21' is a substantially flat portion 24 which lies in substantially the same plane as the leaf portion 19. Adjacent the flat portion 24 and preferably integral therewith, is an arcuate longitudinal bead 25, the free edge of which is folded back as at 26 so as to form a reinforcing ridge conforming with the arcuate conformation of the bead 25. Similarly, the free edge of the marginal portion 17 is folded back to form a reinforcing strip 28.

When it is desired to install the strip described above, it is placed in contact with a door frame as shown in Fig. 2, and tacks, screws, or similar attaching members are passed through the apertures 23 and serve to secure the strip to the frame. An instrument having a relatively sharp edge, is then drawn with some force along the groove 22 between the parallel ridges 21. Such an instrument may comprise a screw driver, a knife, an awl, a disk having a relatively sharp edge and rotatably mounted in a suitable handle, or any other convenient tool. The result of this act is to cause the free portion of the strip beyond the groove 22 to spring outwardly from the frame and to take a position substantially as shown in Fig. 2, so that the arcuate bead 25 may be in relatively close contact with the door 10 when the latter is closed. The parallel ridges may therefore be said to have two functions: First, it serves as a guide for the knife or other tool which is drawn along the groove 22 and prevents slipping of the knife, with resultant marring of the strip. Secondly, the ridges may be said to have a stiffening effect on the strip and therefore tend to increase its efficiency after it has been applied. As a result of this function the marginal portion 17 will lie perfectly flat against the door frame and there will be a total absence of bulging between the securing members; hence, it will be practically impossible for air, dust, etc. to pass between the strip and the door frame.

The parallel ridges 21' perform a similar function to the last one indicated for the ridges 21; that is, they tend to stiffen the free edge of the strip and prevent undulations therein, causing the strip to make a firm contact all along its free edge with the door.

In Fig. 4 is shown an improved weather strip embodying my invention as applied to a window. Thus, the reference character 30 designates generally a window frame in which a window sash 31 is slidably mounted. The improved weather strip 17 is secured to the frame 30 by means of nails or screws 15, or other suitable means, and has its arcuate bead 25 in contact with the sliding edge of the sash 31. Of course, the weather strip 14 may extend the full length of the window so that its bead 25 will engage the sash 31 at all times. It will be readily understood that the weather strip 17 may be quickly and easily adjusted at any time to bring its bead 25 into more effective engagement with the sash 31. This may be accomplished as described above by drawing a sharp tool or instrument between the ridges 21.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desired to secure by Letters Patent is:

A weather strip comprising a thin metal plate having a plurality of longitudinally extending spaced apart grooves, an inwardly turned flange on one edge portion of the plate providing rigidity adapting said edge portion for a nailing strip, the other longitudinal edge portion of the plate comprising an arcuate bead having an inturned flange, said beaded portion being thereby adapted to cooperate with a member movable in contact therewith and to yield under pressure resulting from contact with said movable member.

In witness whereof, I hereunto subscribe my name this 30th day of January A. D., 1929.

WILLIAM J. DENNIS.